United States Patent [19]

Janssen

[11] Patent Number: 4,510,508
[45] Date of Patent: Apr. 9, 1985

[54] OPTICAL DISC PRESSURE-COLLAPSIBLE COVER

[75] Inventor: Peter J. M. Janssen, Eindhoven, Netherlands

[73] Assignee: U.S. Philips Corporation, New York, N.Y.

[21] Appl. No.: 485,530

[22] Filed: Apr. 15, 1983

[30] Foreign Application Priority Data

Feb. 9, 1983 [NL] Netherlands ................. 8300478

[51] Int. Cl.³ .................. G01D 15/34; G11B 7/24
[52] U.S. Cl. .................. 346/135.1; 346/137; 369/284; 369/287; 369/275
[58] Field of Search ............ 346/76 L, 135.1, 137; 369/284, 287, 275

[56] References Cited

U.S. PATENT DOCUMENTS 4,365,257 12/1982 Gerfast ..................... 346/135.1
4,365,258 12/1982 Geyer et al. ................ 346/137 X
4,380,016 4/1983 Lehureau et al. ........... 346/135.1 X Primary Examiner—E. A. Goldberg
Assistant Examiner—Gerald E. Preston
Attorney, Agent, or Firm—Robert T. Mayer; Algy Tamoshunas

[57] ABSTRACT

An optically readable storage disc comprises a transparent substrate 1 on which a recording layer 2 is deposited which can be modified locally by means of a radiation beam, which recording layer is covered by a cover disc 3 which is secured to the substrate in a gas-tight manner at some distance from the part of the recording layer which is intended for recording, so that a sealed space 4 is enclosed between the substrate 1 and the cover disc 3. The cover disc 3 will be deformed to the greatest extent under the influence of differences between the gas pressure in the sealed space 4 and the barometric pressure because its resistance to deformation is substantially smaller, so that deformation of the substrate 1 is substantially precluded.

5 Claims, 1 Drawing Figure

U.S. Patent  Apr. 9, 1985  4,510,508
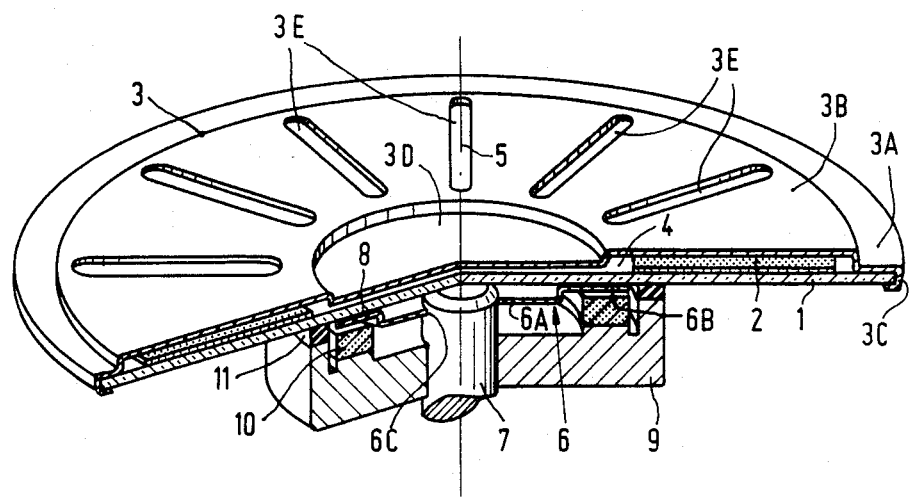

OPTICAL DISC PRESSURE-COLLAPSIBLE COVER

The invention relates to an optically readable storage disc comprising: a transparent substrate, a recording layer on the substrate, which layer can be modified locally by means of a radiation beam, and a cover disc which is secured to the substrate in a substantially gas-tight manner at a distance from at least that part of the recording layer which is intended for recording, so that a sealed space is enclosed between the substrate and the cover disc.

Such a storage disc is known, for example from U.S. Pat. No. 4,074,282. The storage disc comprises a plurality of flat discs which are spaced from each other by concentric annular spacers glued between them near a central aperture and near the circumference of the storage disc. In practice a storage disc which comprises two glass substrates between which two concentric annular spacers are glued, is used most frequently until now. Each of the glass substrates is provided with a recording layer on the side which faces the sealed space. Thus, the disc may be used on both sides and the one substrate serves as a cover disc for the other substrate.

The gas-tight sealing of the enclosed space of this known storage disc is necessary for two reasons. The recording layer is formed by vacuum-deposition of a tellurium alloy on the glass substrate. During recording pits are formed in the tellurium layer through local melting by means of a laser beam. Environmentally less desirable gaseous by-products are then released. The sealed space then functions as a space in which these gaseous by-products are trapped. Furthermore, it is desirable to protect the tellurium layer against atmospheric influences, in particular against moisture in combination with oxygen, because a fast oxydization of the tellurium layer would occur, which would impair the readability of the recorded information. The presence of a gas-tight sealed space is therefore essential. On the other hand, this presence is also a source of problems. In particular, the deformation of the storage disc under the influence of changes in the barometric pressure. Said known storage discs have a diameter of approximately 30 cm and although they comprise glass substrates of some millimeters thickness they may be deformed to an undesired extent. Such deformations may impair the recording and reading process but they also load the critical layers of glue between the substrates and the annular spacers. It is the object of the invention to provide an optically readable storage disc of the type mentioned in the opening paragraph which has improved properties in this respect and which in principle is suitable for use up to altitudes of a few thousands of meters above sea level and the invention is characterized in that in comparison with the substrate the cover disc has a substantially lower resistance to deformations caused by differences between the gas pressure in the sealed space and the barometric pressure.

The storage disc in accordance with the invention employs a cover disc which differs from the substrate so that generally the storage disc can be used on one side only. The lower resistance of the cover disc to deformations caused by differences between the gas pressure in the sealed space and the barometric pressure ensures that the substrate deforms to a substantially smaller extent than the known storage disc. For many uses the one-side storage capability of the disc is no problem, whilst it is of great importance that the substrate remains flat under all conditions of barometric pressure.

Preferably, the cover disc is made of thin metal sheet. Such a cover disc is perfectly gas-tight, easy to manufacture and depending on the thickness, which in principle can be very small, it is also sufficiently flexible in relation to the deformability of the substrate.

One embodiment is characterized in that the cover disc is formed as a shallow tray comprising first portions for the connection to the substrate, which first portions are disposed in a first plane, and second portions, for covering the sealed space, which second portions are disposed substantially in a second plane at some distance from and parallel to the first plane.

In accordance with another advantageous characteristic feature the cover disc comprises third portions which adjoin the first portions and which comprise the circumference of the substrate. It is envisaged that the substrate will generally be glued to the cover disc. Some glues which are suitable for the purpose, such as epoxy resins, require heating of the product to a temperature to 80° to 90° C. for a correct and fast curing. The last-mentioned embodiment has the advantage that the cover disc and the substrate are centred relative to each other before the layer of glue has cured, which is of great importance for an efficient production. A second advantage is that the layer of glue may have a greater length than in the case that the third portion does not comprise the circumference of the substrate. It will be evident that the gas-tight sealing of the sealed space improves as the path-length to be covered through the layer of glue from the atmospheric air to the sealed space is greater. In this respect another embodiment is of interest, which is characterized in that the said third portions are folded around the circumference of the substrate. This leads to a further increase of said path-length. The principal advantage of this embodiment, however, it that before the layer of glue is subjected to a thermal treatment the storage disc already forms a structural unit and can therefore be handled without problems. This embodiment has additional advantages for storage discs in which the cover disc is not glued to the substrate and in which a permanently elastic sealing layer is present between the cover disc and the substrate. The folded-over edge loads the elastic sealing layer permanently in compression, which is of great importance for the quality of the gas-tight seal. Such storage discs may have a shorter life expentancy than the storage discs in which the cover disc is glued to the substrate. However, for some uses it need not be an objection. A rapid and cheap manufacture and consequently a low price may be of greater importance to the consumer than the life expencancy of the disc.

The problems associated with the gas-tight connection of the cover disc to the substrate can be mitigated by the use of an embodiment of the invention which is characterized in that the substrate comprises a flat circular disc without central aperture and the cover disc is connected to the substrate only near the circumference. In comparison with the afore-mentioned known optical storage discs such an embodiment of the invention has the advantage that only one connection is required between the substrate and the cover disc. Since the substrate and the cover disc are not interconnected near the centre, this has the additional advantage that both the substrate and the cover disc have a lower resistance to flexure under the influence of differences between the pressure in the sealed space and the barometric pressure. However, the ratio of the two rigidities increases even further, so that the situation as regards the deformation of the substrate does not become more unfavourable. Since the cover disc now has a greater span and is even more flexible, it is not unlikely that under certain conditions—for example due to mishandling or in the case of an extremely high ambient pressure—the cover disc would be pressed against parts of the recording layer which are intended for recording, so that these parts could be damaged, thereby rendering the storage disc unserviceable.

An embodiment of the invention which provides an improvement in this respect is characterized in that the shallow tray comprises central fourth portions disposed in a plane between the first two planes and above a part of the substrate which is not intended for recording.

Another embodiment has the advantage that, in the case of a metal cover disc, a very thin and flexible material may be used without the risk that the cover disc can be pressed against the recording layer in the part between the third and fourth portions, i.e. in the part facing the part of the recording layer intended for recording, and is characterized in that the cover disc is formed with radial reinforcements obtained by local deformation.

The invention will now be described in more detail, by way of example, with reference to the drawing which is a perspective view of an optically readable storage disc in accordance with the invention, a part of the storage disc and some parts belonging to an apparatus for driving the storage disc being cut away.

The storage disc comprises a transparent glass or plastic substrate 1. A reflecting recording layer 2, which can be modified locally by means of a radiation beam, is deposited on the substrate. In the present embodiment this recording layer is present only on the substrate area which is actually intended for recording. However, it is possible to deposit the recording layer over a larger part of the substrate, if desired over the entire substrate area. Information is recorded and read through the transparent substrate by means of a laser beam, not shown. A cover disc 3 is fixed to the substrate in a substantially gas-tight manner at some distance from the recording layer 2, so that a sealed space 4 is enclosed between the substrate and the cover disc. The cover disc is substantially thinner than the substrate and has a substantially lower resistance to deformations as may be caused by differences between the gas pressure in the sealed space 4 and the barometric pressure.

The cover disc is made of thin metal sheet, for example aluminium sheet, which is formed into a shallow tray comprising first portions 3A in the form of an annular flange for the connection to the substrate, which flange is disposed in a first plane. Second portions 3B, which constitute the bottom of the shallow tray and which cover the sealed space 4 are disposed in a second plane parallel to the plane in which the flange 3A is disposed. Adjacent the flange 3A third portions are present in the form of a folded-over rim 3C which comprises the circumference of the substrate. These third portions are folded around the circumference of the substrate. The substrate 1 comprises an entirely flat round disc and is not provided with the usual central aperture for centering and placing the disc on a drive apparatus. The cover disc is therefore connected to the substrate only near the circumference. The cover disc also comprises fourth portions 3D in the form of a round embossment whose bottom is disposed in a plane between the afore-mentioned two planes and above a part of the substrate which is not used for recording. This part is disposed at some distance from the substrate but is situated closer to said substrate than the portion 3B. In case of depression of the cover disc this portion, inter alia because it is the most central portion, will first come into contact with the substrate but in an area where this has no undesired consequences. In this respect it is important, especially when a very thin metal sheet is used, that the cover disc is provided with radial reinforcements 3E formed by local deformation. These reinforcements ensure that the portion 3B has the required rigidity.

The storage disc can be rotated about a central axis of rotation 5. On the side facing the recording layer 2 the substrate carries an axially projecting central centering member 6. This member is adapted to cooperate with centering means in the form of a spindle 7 of an apparatus, not shown, for inscribing and/or reading optically readable storage discs. A suitable apparatus, part from the centering means which are of a slightly different construction and which are intended for cooperation with discs having a central aperture, is described in Netherlands Patent Application No. 8300133 which has not been published corresponding to U.S. application Ser. No. 471,971, filed Mar. 4, 1983, centering member 6 is made of steel sheet and is connected to the substrate by a layer of glue 8. It comprises a flat flanged rim 6B which is connected to the substrate by the layer of glue 8. The bottom 6A of the centering member 6 is formed with a central centering aperture 6C through which the spindle 7 extends with a slight clearance. This spindle may be the motor spindle of a drive motor, allowing a very simple yet sufficiently accurate centering of the storage disc on the drive apparatus.

The spindle 7 carries a turntable 9 which supports the substrate 1. The turntable carries an annular permanent magnet 10 which draws the sheet-steel centering means 6 axially onto the turntable 9. Furthermore, the turntable comprises a ring 11 of a suitable elastic material which is subject to a slight elastic deformation as a result of the force of attraction of the permanent magnet 10. In the present embodiment the ring 11 cooperates directly with the substrate 1. Alternatively, the flange 6B of the centering means 6 may be given a greater diameter, so that the ring 6 does not cooperate directly with the substrate 1 but with the flange 6B. The free end of the motor spindle 7 bears against the underside of the substrate and thus constitutes a stop which defines the axial position of the information disc on the turntable 9.

The invention is not limited to the embodiment shown in the drawing but many different embodiments are possible within the scope of the invention as defined in the claims. The substrate 1 may have a central aperture, so that the cover disc 3 and the substrate are also interconnected nearer the center of the substrate. The cover disc may be of a material other than a metal, for example, a suitable plastic. Generally, a plastic is not absolutely moisture-proof, but this need not be an objection for discs which only need to have a limited lifetime.

The provision of a substrate without a center aperture has additional advantages as discussed and explained in co-pending U.S. patent application Ser. No. 490,801 filed May 2, 1983 . . . (PHN 10.576) (herewith incorporated by reference).

What is claimed is:

1. An optically readable information storage disc comprising a transparent disc-shaped substrate, a recording layer disposed on the substrate, said layer being locally modifiable by a beam of radiation, and a cover disc secured to said substrate in a substantially gas-tight manner and having a portion which is spaced from at least that part of said recording layer on which information is to be recorded so as to form a sealed space therebetween, said cover disc being sufficiently flexible so that its resistance to deformations due to differences between gas pressure in said sealed space and ambient barometric pressure is substantially lower than that of said substrate so as to reduce deformations of said substrate due to said pressure differences.

2. The storage disc according to claim 1 wherein said cover plate is made of a thin metal sheet.

3. The storage disc according to claim 1 or 2 wherein said cover disc has a peripheral portion which is disposed in a first plane which is parallel to the plane of said substrate, said peripheral portion of said cover plate being secured directly to said substrate and wherein said portion of said cover disc extending over said recording layer and forming said space is disposed in a second plane which is parallel to and spaced from said first plane.

4. The storage disc according to claim 3 wherein said cover disc has a further portion which adjoins said peripheral portion and which extends about and is folded over the circumference of said substrate.

5. The storage disc according to claim 4 wherein said substrate is a continuous sheet without a central aperture, said cover disc being disposed on one side of and being secured to said substrate only along a circumferential portion thereof, said cover disc having a central circular portion disposed in a plane between said first and second planes, said storage disc further comprising a centering member disposed opposite said central portion and secured to the other side of said substrate, said centering member being configured to engage a mating element on a turntable so as to center said storage disc about an axis of rotation.

* * * * *